(12) United States Patent
Han et al.

(10) Patent No.: US 9,007,345 B2
(45) Date of Patent: Apr. 14, 2015

(54) METHOD AND APPARATUS FOR DISPLAYING AN OBJECT

(75) Inventors: Young-ran Han, Suwon-si (KR); Hee-won Lee, Paju-si (KR); Kyoung-oh Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 13/413,189

(22) Filed: Mar. 6, 2012

(65) Prior Publication Data
US 2012/0256880 A1 Oct. 11, 2012

(30) Foreign Application Priority Data

Apr. 5, 2011 (KR) .................... 10-2011-0031256

(51) Int. Cl.
*G06F 3/042* (2006.01)
*G06F 3/041* (2006.01)

(52) U.S. Cl.
CPC ................ *G06F 3/041* (2013.01); *G06F 3/042* (2013.01); *G06F 2203/04104* (2013.01); *G06F 2203/04106* (2013.01)

(58) Field of Classification Search
None
See application file for complete search history.

(56) References Cited

U.S. PATENT DOCUMENTS

| 2012/0154294 A1* | 6/2012 | Hinckley et al. | ............... 345/173 |
| 2012/0154295 A1* | 6/2012 | Hinckley et al. | ............... 345/173 |
| 2012/0262407 A1* | 10/2012 | Hinckley et al. | ............... 345/173 |

* cited by examiner

*Primary Examiner* — David D Davis
(74) *Attorney, Agent, or Firm* — Sughrue Mion, PLLC

(57) ABSTRACT

A method and apparatus for displaying an object are provided. The display apparatus includes a display unit which displays an object, a first touch sensing unit which senses a user input by a first input method, a second touch sensing unit which senses a user input by a second input method, a coordinate calculation unit which calculates coordinate values sensed by the first and the second touch sensing units, and a controller which, in response to a user input being simultaneously sensed by the first and the second touch sensing units, compares the coordinate values sensed by the first and the second touch sensing units and determines whether the user input is a single touch input or a multi-touch input, and, according to a result of the determination, controls to display the object on the display unit.

16 Claims, 3 Drawing Sheets

COORDINATE VALUE BY FIRST TOUCH SENSING UNIT: $(x_1, y_1)$
COORDINATE VALUE BY SECOND TOUCH SENSING UNIT: $(x_2, y_2)$

COORDINATE VALUE BY FIRST TOUCH SENSING UNIT: $(x_3, y_3)$
COORDINATE VALUE BY SECOND TOUCH SENSING UNIT: $(x_4, y_4)$

COORDINATE VALUE BY SECOND TOUCH SENSING UNIT: $(x_5, y_5)$

COORDINATE VALUE BY SECOND TOUCH SENSING UNIT: $(x_6, y_6)$

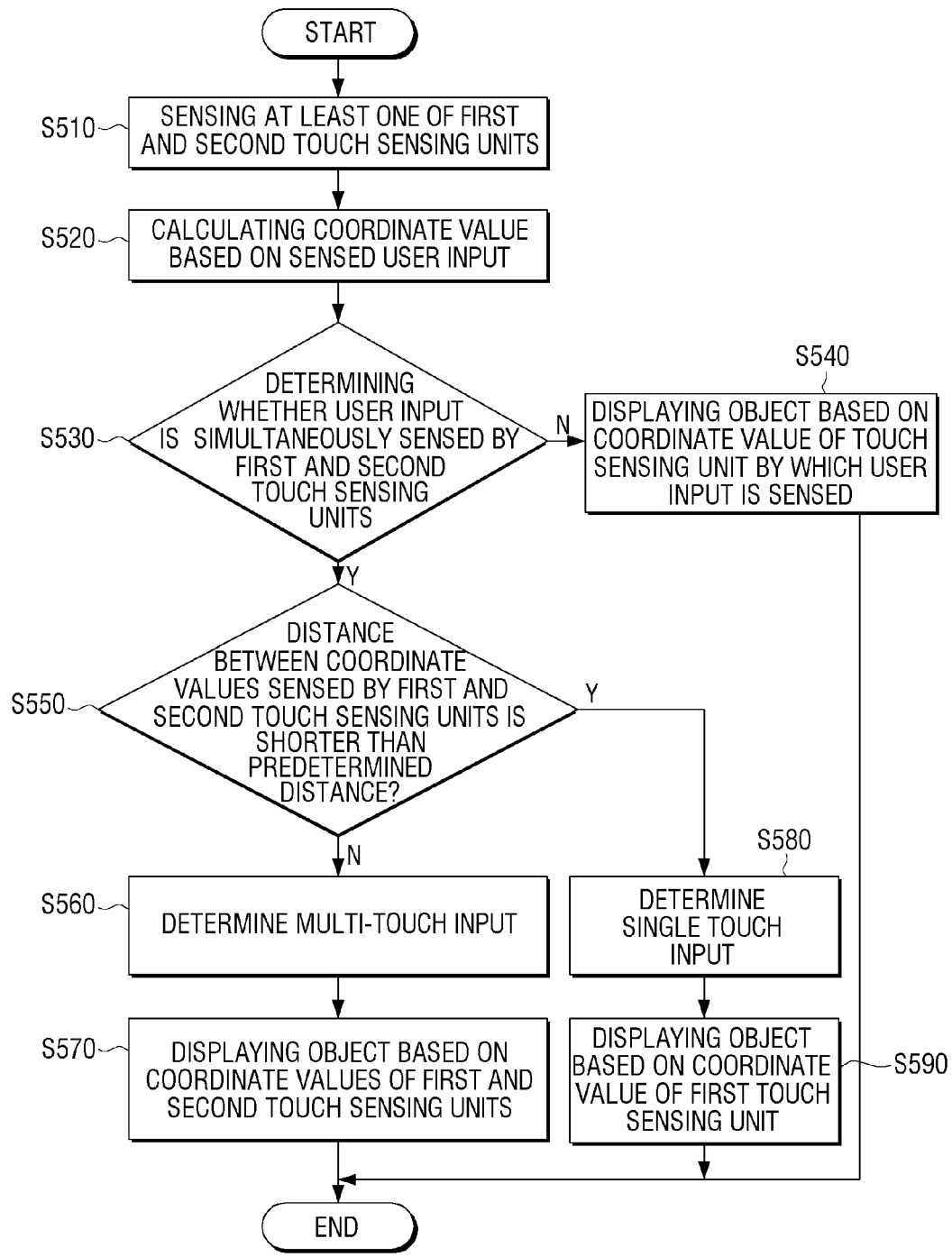

METHOD AND APPARATUS FOR DISPLAYING AN OBJECT

CROSS-REFERENCE TO RELATED APPLICATION

This application claims priority from Korean Patent Application No. 10-2011-0031256, filed on Apr. 5, 2011, in the Korean Intellectual Property Office, the disclosure of which is incorporated herein by reference in its entirety.

BACKGROUND

1. Field

Methods and apparatuses consistent with exemplary embodiments relate to a method and apparatus for displaying an object. More particularly, the exemplary embodiments relate to a display apparatus which includes a plurality of touch sensing units which sense a touch conducted by various input methods, and a method for displaying an object.

2. Description of the Related Art

Various touch methods have been developed for providing input to a display apparatus. In particular, from among the various touch methods, a digital pen method which includes an infrared ray (IR) sensing unit has been widely used in many fields, since it can minutely and precisely recognize coordinates of a point.

Specifically, according to a digital pen method including an IR sensing unit, a plasma display panel (PDP) display apparatus generates IR by scan-discharging in an X-axis direction and a Y-axis direction, and an IR sensing unit of a digital pen obtains IR generated at a corresponding point and transmits a coordinate value of that point (refer to Korean Patent Application No. 2009-0052606). According to another digital pen method, a digital pen including an IR sensing unit captures a surface on which a specific dot pattern is drawn, recognizes coordinates in a space, and transmits the coordinates.

On the other hand, a touch panel adopting such a digital pen method uses a digital pen including an IR sensing unit and thus is not able to recognize a touch by a finger or other object. Therefore, a display apparatus should be provided with a touch panel capable of utilizing different methods (capacitive, resistive, camera, or IR method) in addition to the touch panel of the digital pen method, so that the display apparatus can recognize a touch by a finger or other object.

However, if the touch panel of the digital pen method and the touch panel of different methods are used simultaneously, the problem exists where a plurality of coordinate values are sensed from one point. Specifically, if a user uses a digital pen on a surface of a touch sensing unit, not only the touch panel of the digital pen method but also the touch panel of different methods senses the coordinate value. In this situation, the user cannot smoothly perform an event using the digital pen.

In order to solve this problem, two methods have been used in the related art. One method assigns an ON/OFF mode to one of the two touch panels, and the other method disregards one of the two coordinate values simultaneously input and uses only one coordinate value (for example, a coordinate value obtained by the touch panel of the digital pen method). However, neither of the two methods are able to support a multi-touch input that simultaneously recognizes an input by the digital pen method and an input by other method than the digital pen method.

Therefore, a need exists for a method for supporting a multi-touch input in a display apparatus, including touch sensing units of various input methods.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a display apparatus which, in response to first and second touch sensing units simultaneously sensing user inputs, compares coordinate values sensed by the first and the second touch sensing units and determines whether the user input is a single touch input or a multi-touch input. The one or more exemplary embodiments also provides a method for displaying an object.

According to an aspect of an exemplary embodiment, there is provided a display apparatus comprising: a display unit which displays an object, a first touch sensing unit which senses a user input by a first input method, a second touch sensing unit which senses a user input by a second input method, a coordinate calculation unit which calculates coordinate values sensed by the first and the second touch sensing units, and a controller which, in response to simultaneously sensing a user input by the first and the second touch sensing units, compares the coordinate values sensed by the first and the second touch sensing units and determines whether the user input is a single touch input or a multi-touch input, and, according to a result of the determination, and controls the display of the object on the display unit.

In response to a distance between the coordinate values sensed by the first and the second touch sensing units being shorter than a predetermined distance, the controller may determine that the user input is the single touch input. In response to the distance between the coordinate values sensed by the first and the second touch sensing units being longer than the predetermined distance, the controller may determine that the user input is a multi-touch input.

The single touch input may display only the coordinate value sensed by the first touch sensing unit.

The single touch input may display the coordinate value sensed by one of the first and the second touch sensing units that is set by a user.

The multi-touch input may display all of the coordinate values sensed by the first and the second touch sensing units.

In response to the user input being sensed by only one of the first and the second touch sensing units, the controller may calculate the coordinate value of the touch sensing unit by which the user input is sensed, and may output the coordinate value to the controller.

The first input method may be a digital pen input method including an IR sensing unit.

The second input method may be one of a resistive method, a camera method, an IR method, an optical touch method, and an ultrasonic wave touch method.

The display apparatus may be an electronic board.

According to an aspect of another exemplary embodiment, there is provided a method for displaying an object on a display apparatus which includes a first touch sensing unit of a first input method and a second touch sensing unit of a second input method, the method including sensing a user input by at least one of the first and the second touch sensing units, calculating coordinate values based on the user input sensed by the at least one of the first and the second touch sensing units, in response to a user input being sensed by the first and the second touch sensing units, simultaneously comparing the coordinate values sensed by the first and the second touch sensing units and determining whether the user input is a single touch input or a multi-touch input, and displaying the object according to the result of the determination.

The determination may comprise, in response a distance between the coordinate values sensed by the first and the second touch sensing units being shorter than a predetermined distance, determining that the user input is the single touch input, and, in response to the distance between the coordinate values sensed by the first and the second touch sensing units being longer than the predetermined distance, determining that the user input is the multi-touch input.

The displaying may comprise, in response to the user input being the single touch input, displaying the object based on the coordinate value sensed by the first touch sensing unit.

The method may further include setting the coordinate value calculated by one of the first and the second touch sensing units as a coordinate value by the single touch input, and the displaying may comprise, in response to the user input being the single touch input, displaying the object based on the coordinate value sensed by the set touch sensing unit.

The displaying may comprise, in response to the user input being the multi-touch input, displaying the object based on the coordinate values sensed by the first and the second touch sensing units.

The method may further comprise, in response to the user input being sensed by only one of the first and the second touch sensing units, displaying the coordinate value of the touch sensing unit by which the user input is sensed.

The first input method may be a digital pen input method including an IR sensing unit.

The second input method may be one of a resistive method, a camera method, an IR method, an optical touch method, and an ultrasonic wave touch method.

The display apparatus may be an electronic board.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 5 is a flowchart illustrating a method for displaying an object using a coordinate value sensed by a plurality of touch panels, according to an exemplary embodiment.

DETAILED DESCRIPTION OF THE EXEMPLARY EMBODIMENTS

Figure 1:
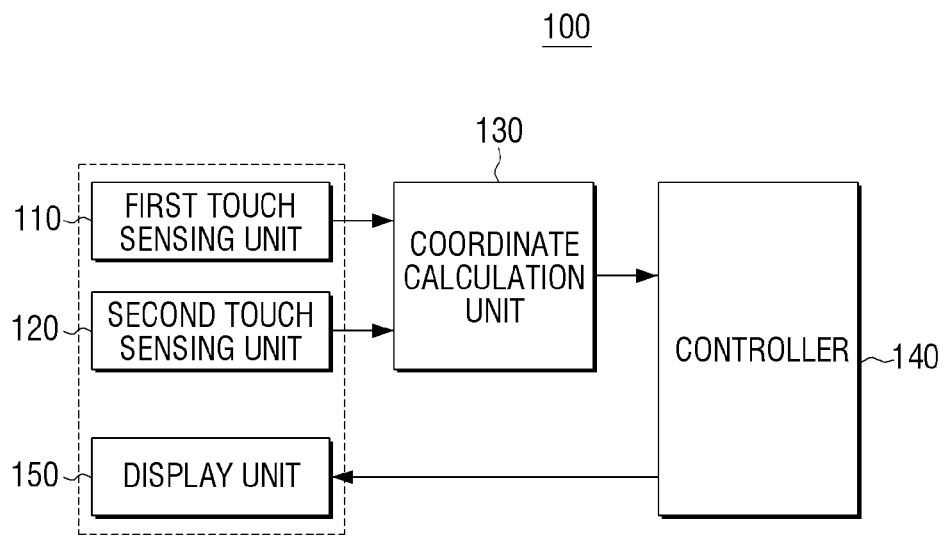
FIG. 1 is a block diagram illustrating a display apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a display apparatus 100 according to an exemplary embodiment. As shown in FIG. 1, display apparatus 100 comprises a first touch sensing unit 110, a second touch sensing unit 120, a coordinate calculation unit 130, a controller 140, and a display unit 150. First touch sensing unit 110, second touch sensing unit 120, and display unit 150 may form one display panel.

First touch sensing unit 110 is a touch sensing unit of a digital pen method that uses a digital pen comprising an infrared ray (IR) sensing unit. As described above, in the digital pen method, the IR sensing unit of the digital pen senses IR generated from a panel and transmits a sensed point to a display apparatus so that a coordinate value of the sensed point is calculated.

Second touch sensing unit 120 is a touch sensing unit of a method other than the digital pen method using the digital pen, which senses a user's finger or an object other than the digital pen. Second touch sensing unit 120 may be a touch sensing unit of one of a resistive method, a camera method, an IR method, an optical touch method, and an ultrasonic wave touch method. More specifically, the resistive touch sensing unit calculates coordinates of a touch point based on a change in a resistance value and a current value of a touch screen, which is caused by a physical pressure exerted to the touch screen. The touch sensing unit of the camera method measures a location of a point to be touched using cameras installed at corners of a display apparatus. The IR touch sensing unit comprises an IR transmitter and an IR receiver installed at corners of a display apparatus to face each other, and measures a location of an object by grasping a time at which the object hinders reception of IR. In addition to using the optical touch method and the ultrasonic wave touch method, the user's finger or the object other than the digital pen can be sensed.

Coordinate calculation unit 130 calculates a coordinate value for a user input sensed by at least one of the first and second touch sensing units 110, 120. Coordinate calculation unit 130 calculates the coordinate value of the user input sensed according to the various input methods. The method for calculating the coordinate in various methods is well known in the related art and thus a detailed description thereof is omitted.

Display unit 150 is controlled by controller 140 to display an object at a point corresponding to the coordinate value calculated by coordinate calculation unit 130.

Controller 140 controls display unit 150 to display the object at the point corresponding to the coordinate value calculated by coordinate calculation unit 130.

More specifically, controller 140 determines whether the user input is sensed by the first and second touch sensing units 110, 120, simultaneously. In response to the user input being sensed by the first and second touch sensing units 110, 120, simultaneously, controller 140 compares coordinate values sensed by the first and second touch sensing units 110, 120 and determines whether the user input is a single touch input or a multi-touch input. More specifically, controller 140 compares a distance between the coordinate values sensed by the first and the second touch sensing units 110, 120 with a predetermined distance, and determines whether the user input is the single touch input or the multi-touch input.

More specifically, in response to the distance between the coordinate values sensed by the first and second touch sensing units 110, 120 being shorter than a predetermined distance, controller 140 determines that the user input is the single touch input, and, in response to the distance between the coordinate values sensed by the first and second touch sensing units 110, 120 being longer than the predetermined distance, controller 140 determines that the user input is the multi-touch input. This is because the methods for calculating the coordinate value of the first and the second touch sensing unit 110, 120 are different and thus a minute difference in the coordinate values exists even in response to the same point being touched. Therefore, in response to the distance between the coordinate values sensed by the two touch sensing units being shorter than the predetermined distance, controller 110 determines that the same point is touched in consideration of this difference and determines that the user input is the single touch input. However, in response to the distance between the coordinate values sensed by the two touch sensing units being longer than the predetermined distance, controller 140 determines that two points have been touched and determines that the user input is a multi-touch input. The predetermined distance is a distance that can be recognized as indicating that the coordinate values sensed by the two touch sensing units 110, 120 are almost the same point, and may be 0.5 mm. However, this is merely an example and a different value may be set.

Also, even in response to the distance between the coordinate values sensed by the first and second touch sensing units 110, 120 being shorter than the predetermined distance, controller 140 may generate a user interface (UI) to ask a user's confirmation as to whether the user input is the single touch input or not. In response to the user confirming that the user input is a single touch input through the UI, controller 140 determines that the user input is the single touch input, and, in response to the user confirming that the user input is a multi-touch input, controller 140 determines that the user input is the multi-touch input.

The above-described single touch input refers to displaying the coordinate value sensed by one of the two touch sensing units. At this time, priority may be given to first touch sensing unit 140 of the digital pen method, which makes it possible to express the sensed value more minutely. However, this is merely an example and a coordinate value of a touch sensing unit set by the user may be displayed. Also, the multi-touch input refers to displaying all of the coordinate values sensed by the two touch sensing units.

However, in response to the user input being sensed by only one of the first and second touch sensing units 110, 120, controller 140 displays the coordinate value of the touch sensing unit by which the user input is sensed.

Figure 2:
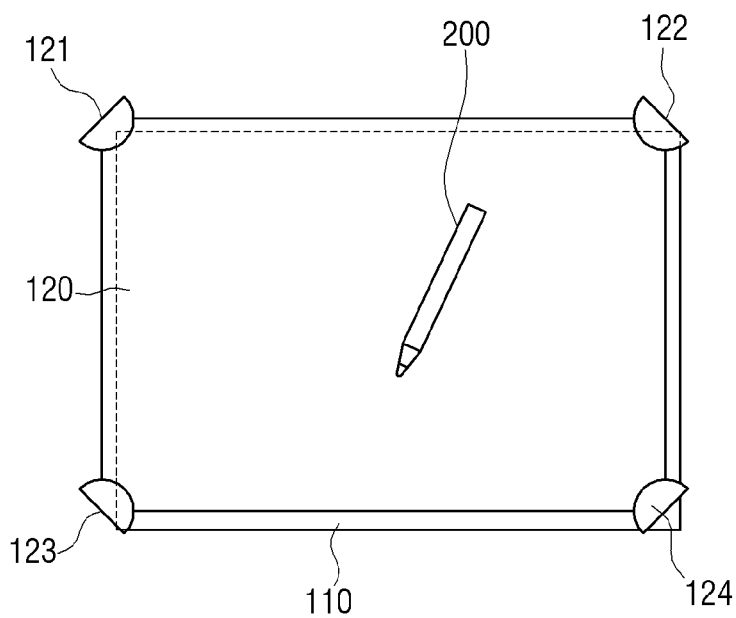
FIG. 2 is a view illustrating a method for calculating a coordinate value, in response to only a digital pen being input, according to an exemplary embodiment.
Figure 3:
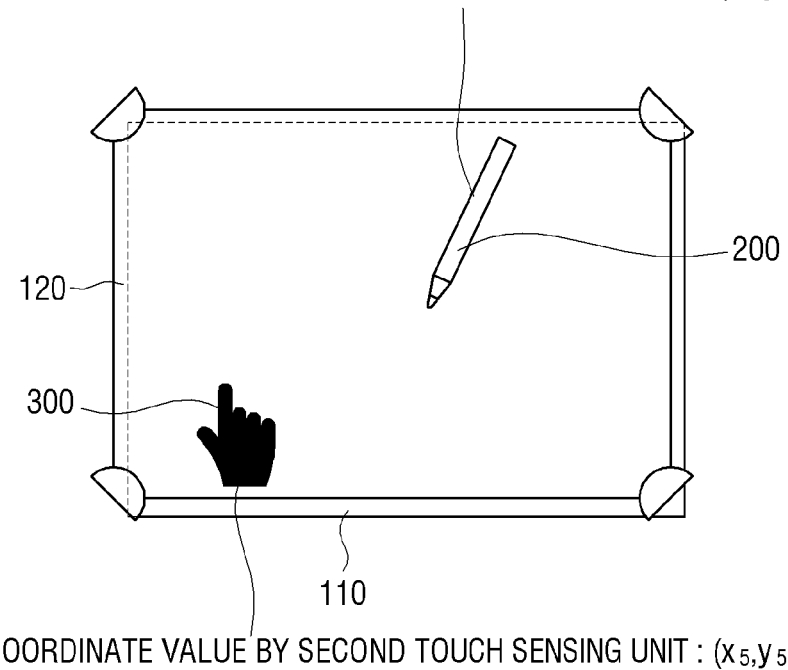
FIG. 3 is a view illustrating a method for calculating a coordinate value, in response to a digital pen and a finger being simultaneously input, according to an exemplary embodiment.
Figure 4:
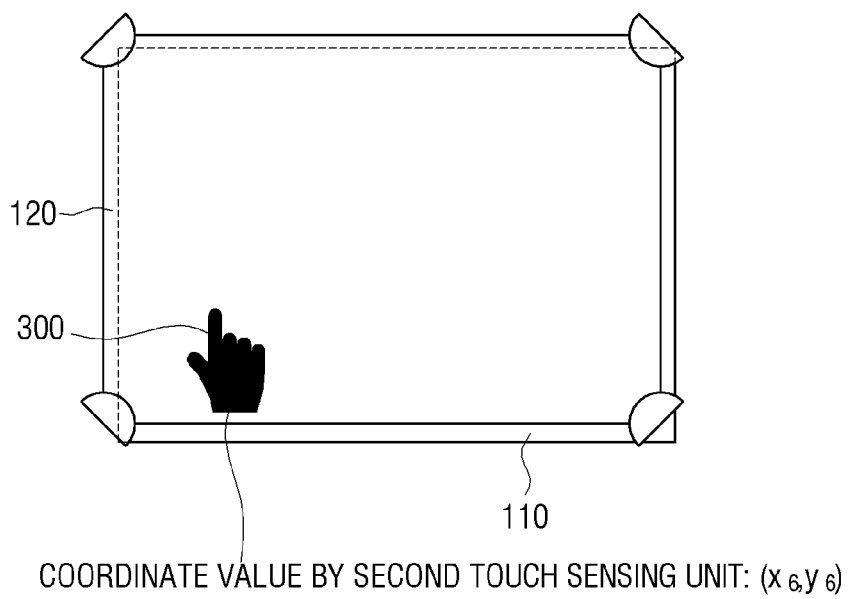
FIG. 4 is a view illustrating a method for calculating a coordinate value, in response to only a finger being input, according to an exemplary embodiment.

Hereinafter, a method of controller 140 calculating a coordinate value according to various exemplary embodiments will be explained with reference to FIGS. 2 to 4. In FIGS. 2 to 4, first touch sensing unit 110 is a touch sensing unit of a digital pen method including an IR sensing unit, and second touch sensing unit 120 is a touch sensing unit of a camera method including cameras 121, 122, 123, 124 installed at the corners. However, this is merely an example and second touch sensing unit 120 may be a touch sensing unit of a resistive method, an IR method, an optical touch method, or an ultrasonic wave touch method.

FIG. 2 is a view illustrating a method for calculating a coordinate value, in response to only a digital pen 200 being input, according to an exemplary embodiment. As shown in FIG. 2, in response to a user touching the plurality of touch sensing units 110, 120 using digital pen 200, first touch sensing unit 110 and second touch sensing unit 120 simultaneously sense digital pen 200.

Since first touch sensing unit 110 and second touch sensing unit 120 simultaneously sense digital pen 200$y$, controller 150 compares a distance between a coordinate value sensed by first touch sensing unit 110 with a coordinate value sensed by second touch sensing unit 120, and a predetermined distance. More specifically, a coordinate value (x1, y1) is sensed by first touch sensing unit 110 and a coordinate value (x2, y2) is sensed by second touch sensing unit 120 are compared. At this time, since digital pen 200 touches the same point of first touch sensing unit 110 and second touch sensing unit 120, the distance between (x1, y1) and (x2, y2) is shorter than a predetermined distance. Accordingly, controller 140 determines that the coordinate values sensed by first touch sensing unit 110 and second touch sensing unit 120 indicate the same point, and displays only the coordinate value of first touch sensing unit 110, giving priority to display unit 150. Accordingly, even though two touch sensing units 110, 120 sense digital pen 200, controller 140 does not display the plurality of coordinate values and displays only the coordinate value of first touch sensing unit 110, which is given priority because of the ability to express a sensed value more minutely.

FIG. 3 is a view illustrating a method for calculating a coordinate value, in response to a digital pen 200 and a finger 300 being simultaneously input according to an exemplary embodiment. As shown in FIG. 3, in response to the user touching the plurality of touch sensing units 110, 120 using digital pen 200 and finger 300, digital pen 200 is sensed by first touch sensing unit 110 and second touch sensing unit 120, and finger 300 is sensed by second touch sensing unit 120.

As described in FIG. 2, even though digital pen 200 is sensed by first touch sensing unit 110 and second touch sensing unit 120, controller 150 simultaneously determines only the coordinate value sensed by first touch sensing unit 110 since the distance between coordinate values (x3,y3) and (x4,y4) sensed by the two touch sensing units 110, 120 is shorter than the predetermined distance.

However, since finger 300 is also simultaneously sensed, controller 200 compares the coordinate value of digital pen 200 sensed by first touch sensing unit 110 and coordinate value of finger 300, sensed by second touch sensing unit 120. More specifically, a distance between the coordinate value (x3, y3) of digital pen 200 sensed by first touch sensing unit 110 and a coordinate value (x5, y5) of finger 300 sensed by second touch sensing unit 110 is compared with the predetermined distance. Since the point touched by digital pen 200 is different from the point touched by finger 300, the distance between (x3,y3) and (x5,y5) is longer than the predetermined distance. Accordingly, controller 140 determines that the coordinate values sensed by first touch sensing unit 110 and second touch sensing unit 120 indicate different points, and thus displays all of the coordinate values (x3,y3) and (x5,y5) sensed by the two touch sensing units 110, 120 on display unit 150. Accordingly, in response to the touches being simultaneously input through different input methods, only the coordinate value of one input method is not displayed and all of the coordinate values of the plurality of input methods are displayed so that the multi-touch input can be supported.

FIG. 4 is a view illustrating a method for calculating a coordinate value, if only a finger 300 is input, according to an exemplary embodiment. As shown in FIG. 4, in response to the user touching the plurality of touch sensing units 110, 120 using finger 300, finger 300 is sensed by only second touch sensing unit 120. This is because finger 300 does not comprise an IR sensing unit.

Accordingly, controller 140 displays only a coordinate value (x6, y6) sensed by second touch sensing unit 120, on display unit 150.

As described above, even in the situation where the plurality of touch sensing units having a plurality of input methods are included, display apparatus 100 determines the single touch input, in response to the touch being input by one of the digital pen and the object other than the digital pen, and determines the multi-touch input, in response to the touch being input by both the digital pen and the object other than the digital pen.

FIG. 5 is a flowchart illustrating a method for displaying an object using coordinate values sensed by a plurality of touch panels according to an exemplary embodiment.

Display apparatus 100 senses at least one of first touch sensing unit 110 and second touch sensing unit 120 (S510). First touch sensing unit 110 is a touch sensing unit of a digital pen method comprising an IR sensing unit, second touch sensing unit 110 is a touch sensing unit of other than the digital pen method, such as resistive, camera, IR, optical touch, and ultrasonic wave touch methods.

Display apparatus 100 calculates a coordinate value for a user input sensed by at least one of the first and second touch sensing units 110, 120 (S520).

Display apparatus 100 determines whether the user input is simultaneously sensed by the first and second touch sensing units 110, 120 (S530). In response to the user input not being simultaneously sensed by the first and second touch sensing units 110, 120, (S530-N), that is, in response to user input being sensed by only one of the first and second touch sensing units 110, 120, display apparatus 110 displays an object based on the coordinate value of the touch sensing unit which sensed the user input. For example, in response to a touch being input using a finger, the user input is sensed by second touch sensing unit 120 and thus display apparatus 100 displays the object based on the coordinate value sensed by the second touch sensing unit 120.

However, in response to the user input being simultaneously sensed by the first and second touch sensing units 110, 120 (S530-Y), display apparatus 100 determines whether or not a distance between the coordinate values sensed by the first and second touch sensing units 110, 120 falls within a predetermined distance (S550). In other words, display apparatus 100 determines whether the coordinate values sensed by the first and second touch sensing units 110, 120 indicate the same point.

In response to the distance between the coordinate values sensed by first and the second touch sensing units 110, 120 falling within the predetermined distance (S550-Y), display apparatus 100 determines that the user input is a single touch input (S580). For example, in response to digital pen 200 being simultaneously sensed by first touch sensing unit 110 and second touch sensing unit 120, the distance between the coordinate values sensed by the first and second touch sensing units 110. 120 falls within the predetermined distance. Accordingly, display apparatus 100 recognizes the user input as a touch input at the same point and determines that the user input is a single touch input.

The single touch input refers to an input for displaying the coordinate value sensed by one of the two touch sensing units. At this time, priority may be given to first touch sensing unit 140 of the digital pen method, which can express a sensed value more minutely. However, this is merely an example and a coordinate value sensed by a touch sensing unit set by the user may be displayed.

In response to the single touch input being determined, display apparatus 100 displays an object based on the coordinate value sensed by first touch sensing unit 110 (S590).

In response to the distance between the coordinate values sensed by the first and second touch sensing units 110. 120 exceeding the predetermined distance (S550-N), display apparatus 100 determines that the use input is a multi-touch input (S560). For example, in response to digital pen 200 being sensed by first touch sensing unit 110 and simultaneously a user's finger is sensed by second touch sensing unit 120, the distance between the coordinate values sensed by the first and second touch sensing units 110, 120 exceeds the predetermined distance. Accordingly, display apparatus 100 recognizes that the touch input to the two touch sensing units occur at different points and determines that the user input is the multi-touch input, The multi-touch input refers to an input for displaying all of the coordinate values sensed by the first and second touch sensing units 110, 120.

In response to a multi-touch input being determined, display apparatus 100 displays the object based on all of the coordinate values sensed by first touch sensing unit 110 and second touch sensing unit 120 (S570).

According to the method as described above, a touch can be sensed using not only the digital pen but also a finger or an object other than the digital pen, and in response to the digital pen and the finger or object other than the digital pen being simultaneously touched, a determination of a multi-touch input is additionally supported.

Display apparatus 100 according to the exemplary embodiments may be an electronic board of a big screen. However, this is merely an example and any display apparatus that allows a user input using a touch sensing unit can be applied.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display unit which displays an object;
a first touch sensing unit which senses a user input by a first input method;
a second touch sensing unit which senses a user input by a second input method;
a coordinate calculation unit which calculates coordinate values sensed by the first and the second touch sensing units; and
a controller which, in response to a user input being simultaneously sensed by the first and second touch sensing units determines a distance between the coordinate values sensed by the first and the second touch sensing units and determines whether the user input is a single touch input or a multi-touch input by comparing the distance between the coordinate values sensed by the first and the second touch sensing units to a predetermined value, and, controls display of the object on the display unit according to a result of the determination,
wherein the single touch input displays object at the coordinate value sensed by one of the first and second touch sensing units, wherein the multi-touch input displays objects at all of the coordinate values sensed by the first and second touch sensing units.

2. The display apparatus as claimed in claim 1, wherein the single touch input displays only the coordinate value sensed by the first touch sensing unit.

3. The display apparatus as claimed in claim 1, wherein the single touch input displays the coordinate value sensed by one of the first and second touch sensing units set by a user.

4. The display apparatus as claimed in claim 1, wherein the multi-touch input displays all of the coordinate values sensed by the first and second touch sensing units.

5. The display apparatus as claimed in claim 1, wherein, in response to the user input being sensed by only one of the first and the second touch sensing units, the controller calculates the coordinate value of the touch sensing unit which is sensed, and outputs the coordinate value to the controller.

6. The display apparatus as claimed in claim 1, further comprising: the first input method is a digital pen input method including an IR sensing unit.

7. The display apparatus as claimed in claim 1, wherein the second input method is one of a resistive method, a camera method, an IR method, an optical touch method, and an ultrasonic wave touch method.

8. The display apparatus as claimed in claim 1, further comprising: the display apparatus is an electronic board.

9. A method for displaying an object on a display apparatus which comprises a first touch sensing unit of a first input method and a second touch sensing unit of a second input method, the method comprising:
    sensing a user input by at least one of the first and the second touch sensing units;
    calculating coordinate values based on the user input sensed by the at least one of the first and the second touch sensing units;
    in response to a user input being simultaneously sensed by the first and second touch sensing units, comparing the coordinate values sensed by the first and the second touch sensing units and determining whether the user input is a single touch input or a multi-touch input; and
    in response to a user input being simultaneously sensed by the first and second touch sensing units, determining a distance between the coordinate values sensed by the first and the second touch sensing units and determining whether the user input is a single touch input or a multi-touch input by comparing the distance between the coordinate values sensed by the first and the second touch sensing units to a predetermined value, and, controlling display of the object on the display unit according to a result of the determination,
    wherein the single touch input displays object at the coordinate value sensed by one of the first and second touch sensing units, wherein the multi-touch input displays objects at all of the coordinate values sensed by the first and second touch sensing units.

10. The method as claimed in claim 9, wherein the displaying comprises: in response to the user input being the single touch input, displaying the object based on the coordinate value sensed by the first touch sensing unit.

11. The method as claimed in claim 9, further comprising: setting the coordinate value calculated by one of the first and the second touch sensing units as a coordinate value by the single touch input,
    wherein the displaying comprises, in response to the user input being the single touch input, displaying the object based on the coordinate value sensed by the first touch sensing unit.

12. The method as claimed in claim 9, wherein the displaying comprises: in response to the user input being the multi-touch input, displaying the object based on the coordinate values sensed by the first and second touch sensing units.

13. The method as claimed in claim 9, further comprising: in response to the user input being sensed by only one of the first and the second touch sensing units, displaying the coordinate value of the touch sensing unit by which the user input is sensed.

14. The method as claimed in claim 9, wherein the first input method is a digital pen input method comprising an IR sensing unit.

15. The method as claimed in claim 9, wherein the second input method is one of a resistive method, a camera method, an IR method, an optical touch method, and an ultrasonic wave touch method.

16. The method as claimed in claim 9, wherein the display apparatus is an electronic board.

* * * * *